US012251043B2

(12) United States Patent
Mo et al.

(10) Patent No.: US 12,251,043 B2
(45) Date of Patent: Mar. 18, 2025

(54) COOKING APPLIANCE

(71) Applicant: FOSHAN SHUNDE MIDEA ELECTRICAL HEATING APPLIANCES MANUFACTURING CO., LTD., Foshan (CN)

(72) Inventors: Rongkang Mo, Foshan (CN); Yanping Song, Foshan (CN); Weigang Lv, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 838 days.

(21) Appl. No.: 17/419,186

(22) PCT Filed: Oct. 9, 2019

(86) PCT No.: PCT/CN2019/110127
§ 371 (c)(1),
(2) Date: Jun. 28, 2021

(87) PCT Pub. No.: WO2020/134318
PCT Pub. Date: Jul. 2, 2020

(65) Prior Publication Data
US 2022/0117439 A1 Apr. 21, 2022

(30) Foreign Application Priority Data

Dec. 29, 2018 (CN) .......................... 201811646057.3
Dec. 29, 2018 (CN) .......................... 201822277037.5

(51) Int. Cl.
*A47J 37/06* (2006.01)
*A47J 27/08* (2006.01)
*A47J 27/086* (2006.01)
*A47J 27/09* (2006.01)
*A47J 36/32* (2006.01)
*A47J 36/06* (2006.01)
*A47J 36/10* (2006.01)

(52) U.S. Cl.
CPC ....... *A47J 37/0641* (2013.01); *A47J 27/0802* (2013.01); *A47J 27/0806* (2013.01);
(Continued)

(58) Field of Classification Search
CPC ................ A47J 27/0802; A47J 27/0804; A47J 27/0806; A47J 27/086; A47J 36/06; A47J 36/10; A47J 37/0641
See application file for complete search history.

(56) References Cited

U.S. PATENT DOCUMENTS 5,839,357 A 11/1998 Ha et al.
2015/0351578 A1 12/2015 Song et al.
2016/0345766 A1* 12/2016 Sapire ................ A47J 27/0815

FOREIGN PATENT DOCUMENTS

CN 201911875 U 8/2011
CN 203088712 U 7/2013
(Continued)

OTHER PUBLICATIONS

Japan Patent Office (JPO) The Office Action for JP Application No. 2021-538285 Aug. 9, 2022 8 Pages (Translation Included).
(Continued)

*Primary Examiner* — Reginald Alexander
(74) *Attorney, Agent, or Firm* — Anova Law Group, PLLC

(57) ABSTRACT

A cooking appliance includes a pot body assembly, a first pot cover assembly, a second pot cover assembly a heating control assembly. The pot body assembly includes a food container configured to hold food and a first heating assembly configured to heat the food in the food container. The second pot cover assembly includes a second heating assembly configured to heat the food in the food container. The heating control assembly is configured to detect a closing state of the second pot cover assembly on the pot body
(Continued)

assembly and control the first heating assembly not to operate in response to detecting that the second pot cover assembly is closed on the pot body assembly.

15 Claims, 10 Drawing Sheets

(52) U.S. Cl.
CPC ............ *A47J 27/086* (2013.01); *A47J 27/09* (2013.01); *A47J 36/32* (2013.01); *A47J 36/06* (2013.01); *A47J 36/10* (2013.01)

(56) References Cited

FOREIGN PATENT DOCUMENTS

| | | |
|---|---|---|
| CN | 204015964 U | 12/2014 |
| CN | 206137865 U | 5/2017 |
| CN | 107616671 A | 1/2018 |
| CN | 107616686 A | 1/2018 |
| CN | 108095526 A | 6/2018 |
| CN | 108158418 A | 6/2018 |
| CN | 108402891 A | 8/2018 |
| EP | 3689202 A1 * | 8/2020 ............... A23L 5/13 |
| JP | H02265511 A | 10/1990 |
| JP | 2018102627 A | 7/2018 |
| JP | 2018121757 A | 8/2018 |

OTHER PUBLICATIONS

World Intellectual Property Organization (WIPO) International Search Report and Written Opinion for PCT/CN2019/110127 Dec. 27, 2019 19 pages (with translation).

The State Intellectual Property Office of People's Republic of China First Office Action for 201811646057.3 Dec. 14, 2020 19 pages (with translation).

* cited by examiner

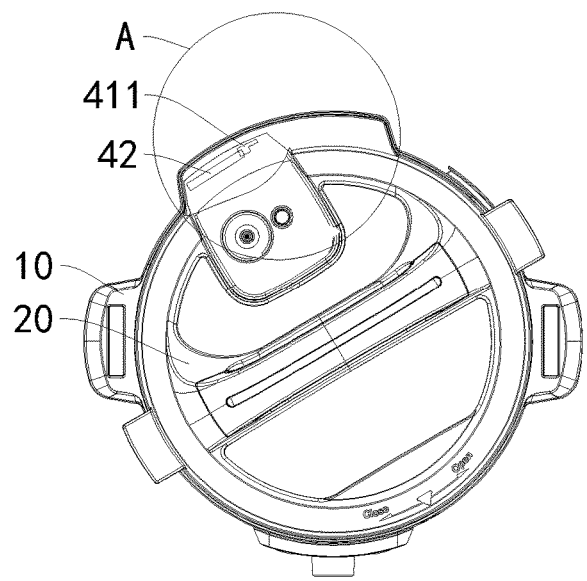
Fig. 4a
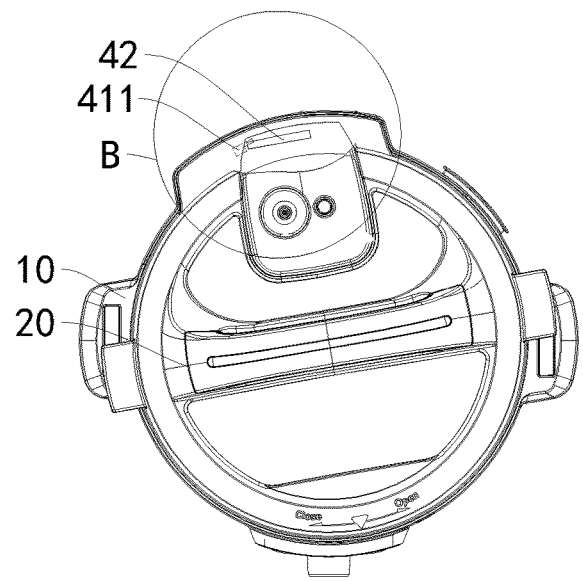
Fig. 4b
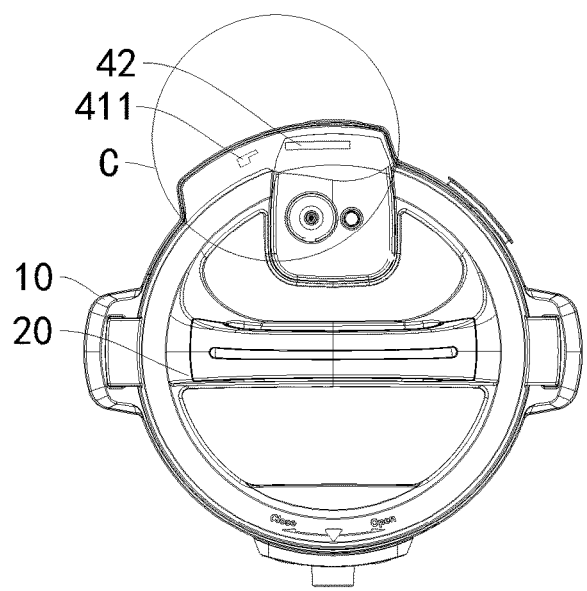
Fig. 4c
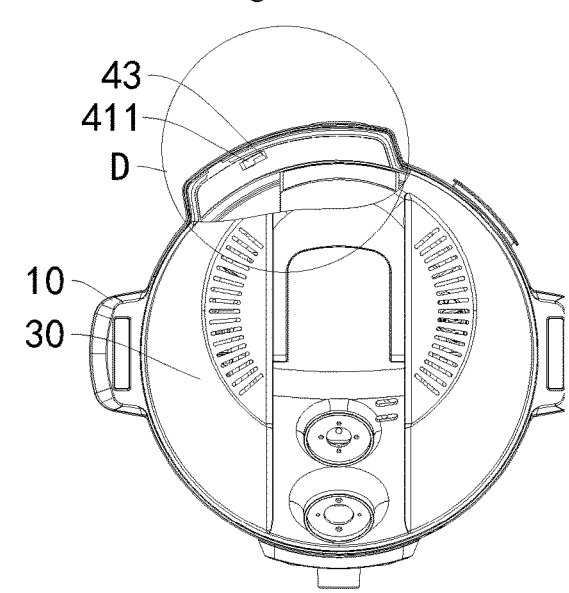
Fig. 4d
Fig. 4

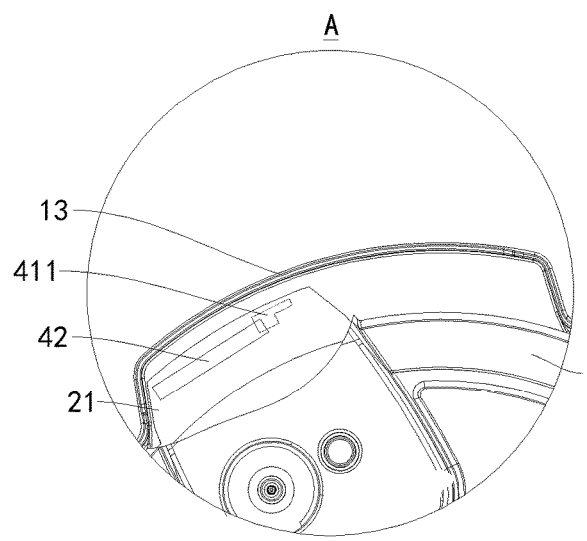
Fig. 5a
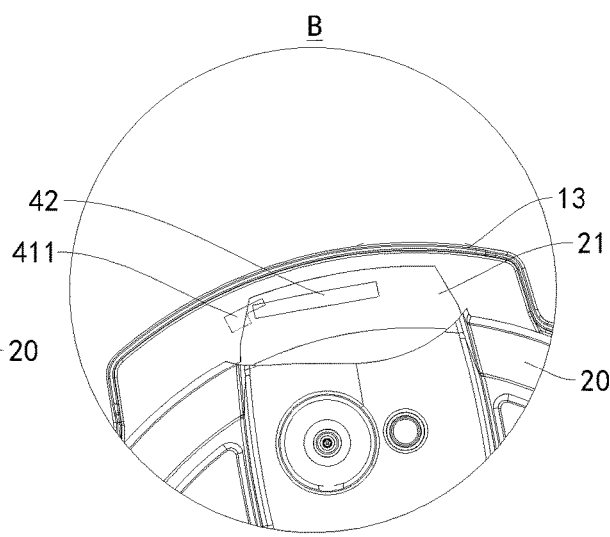
Fig. 5b
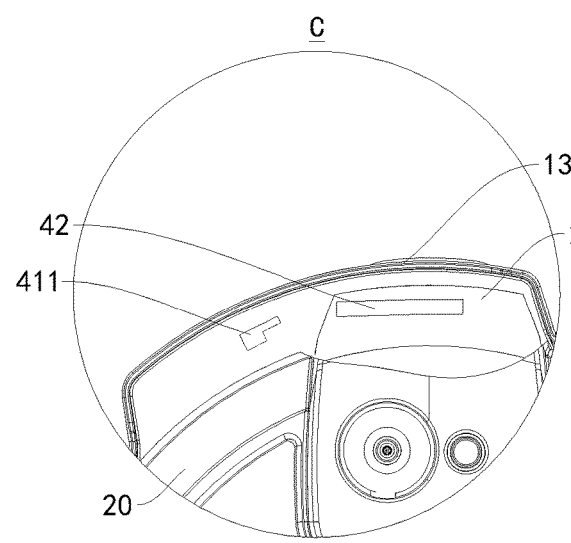
Fig. 5c
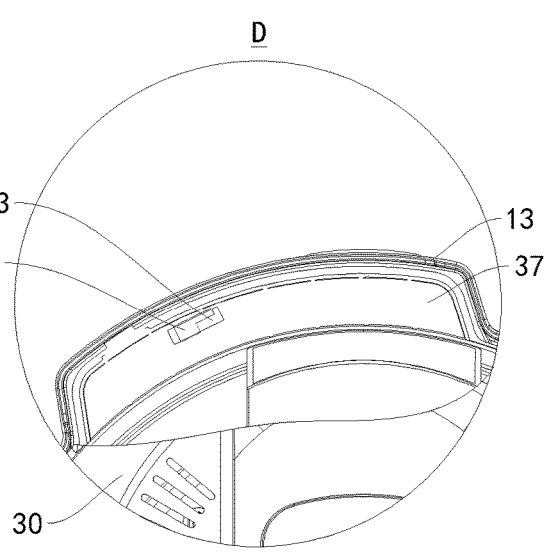
Fig. 5d
Fig. 5

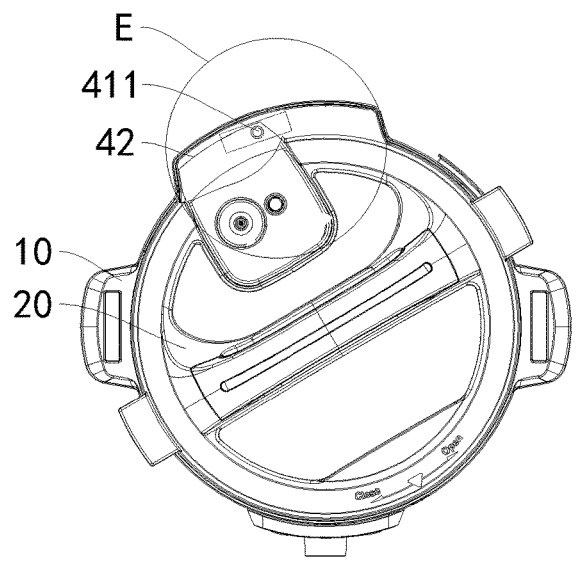
Fig. 7a
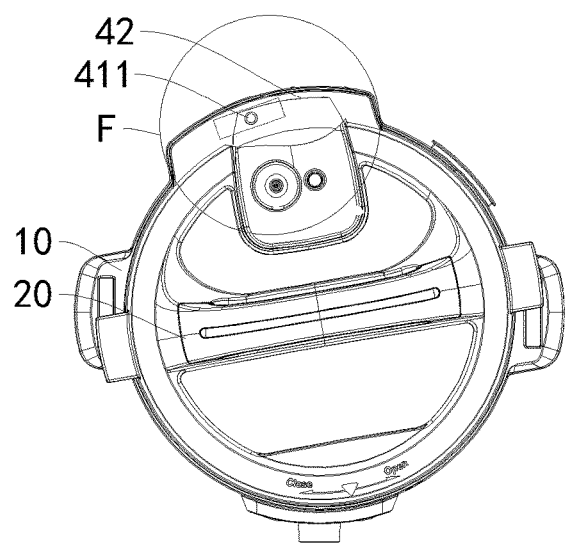
Fig. 7b
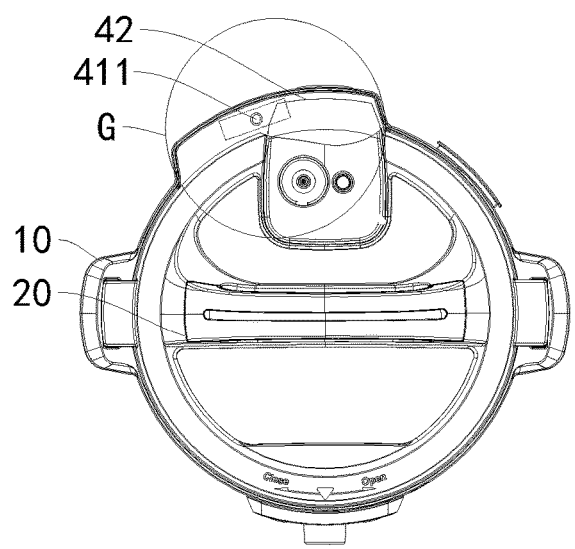
Fig. 7c
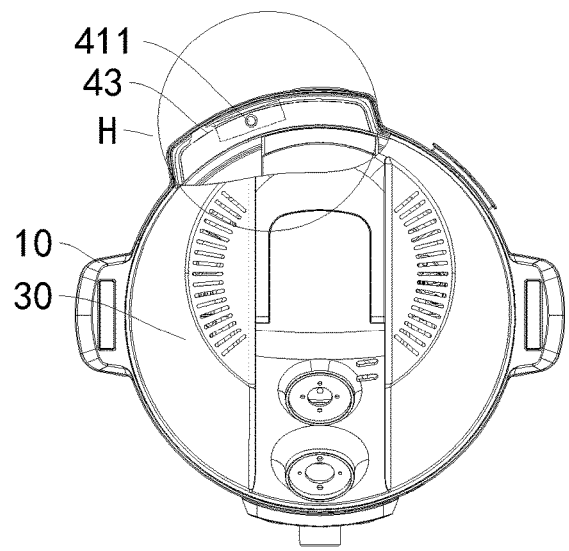
Fig. 7d
Fig. 7

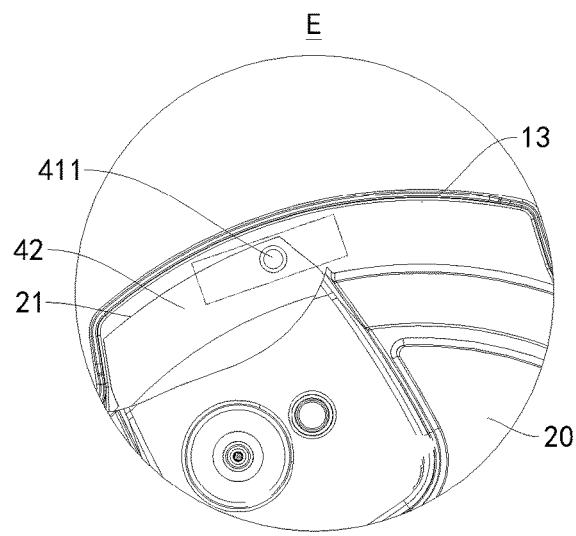
Fig. 8a
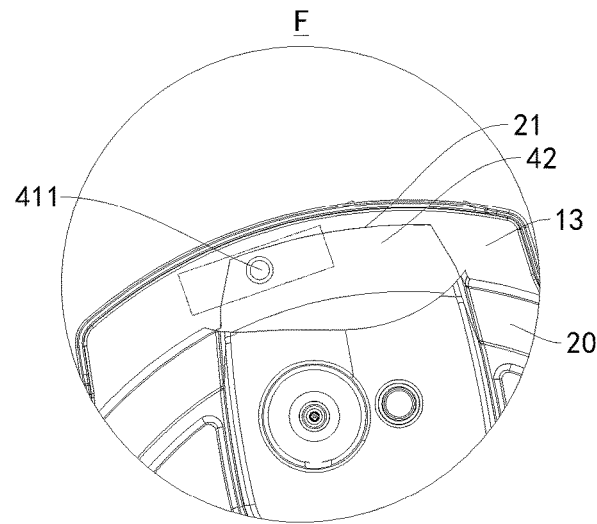
Fig. 8b
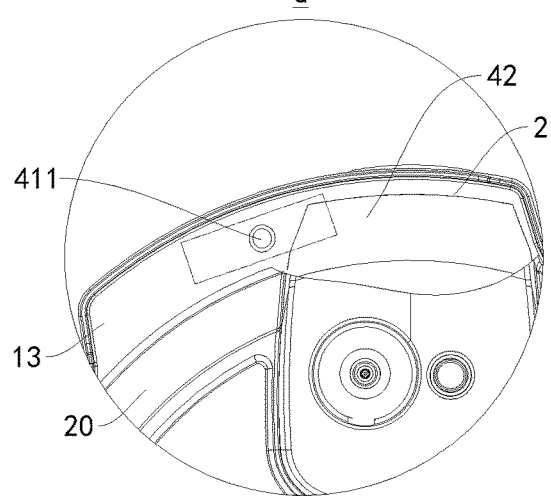
Fig. 8c
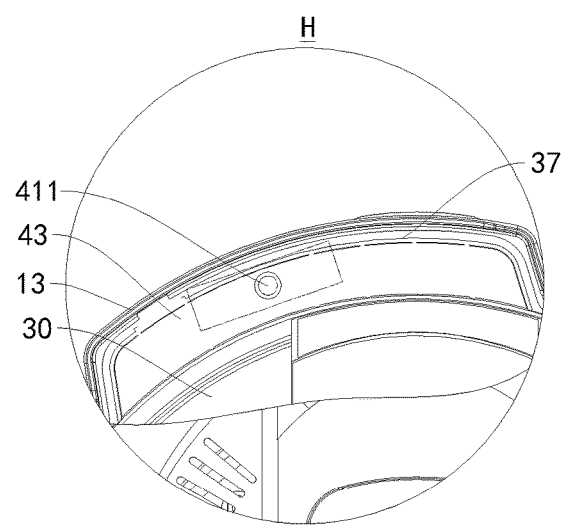
Fig. 8d
Fig. 8

COOKING APPLIANCE

CROSS-REFERENCE TO RELATED APPLICATIONS

This application is a National Stage Entry under 35 U.S.C. § 371 of International Application No. PCT/CN2019/110127, filed on Oct. 9, 2019, which claims priority to Chinese patent application Nos. 201822277037.5 and 201811646057.3 filed by FOSHAN SHUNDE MIDEA ELECTRICAL HEATING APPLIANCES MANUFACTURING CO., LTD. on Dec. 29, 2018. The entire contents of these applications are incorporated herein by reference.

FIELD

The present disclosure relates to a field of cooking technologies, and more particularly, to a cooking appliance.

BACKGROUND

In the related art, a cooking appliance has two heating assemblies, i.e., an upper heating assembly and a lower heating assembly. During use, the two heating assemblies may heat simultaneously, which may cause safety risk.

SUMMARY

The present disclosure intends to solve at least one of the technical problems existing in the related art. For this reason, a purpose of the present disclosure is to provide a cooking appliance, a first heating assembly and a second heating assembly of the cooking appliance do not operate simultaneously, so as to effectively reduce safety risk.

A cooking appliance according to an embodiment of the present disclosure, has a first cooking mode and a second cooking mode, and includes: a pot body assembly including a food container configured to hold food, and a first heating assembly configured to heat the food in the food container; a first pot cover assembly, the cooking appliance being in the first cooking mode when the first pot cover assembly is closed on the pot body assembly and the first heating assembly operates; a second pot cover assembly provided with a second heating assembly configured to heat the food in the food container, the cooking appliance being in the second cooking mode when the second pot cover assembly is closed on the pot body assembly and the second heating assembly operates; a first heating control assembly configured to detect a closing state of the second pot cover assembly on the pot body assembly and to control the first heating assembly not to operate when detecting that the second pot cover assembly is closed on the pot body assembly.

The cooking appliance according to the embodiments of the present disclosure can achieve different cooking effects, meet different cooking requirements, and the first heating assembly and the second heating assembly do not operate simultaneously, which can effectively reduce the safety risk and improve the cooking effect of the food.

In addition, the cooking appliance according to the above embodiment of the present disclosure may also have following additional technical features.

In the cooking appliance according to the embodiments of the present disclosure, the first heating control assembly is further configured to detect a closing state of the first pot cover assembly on the pot body assembly, and the first heating control assembly controls the first heating assembly to operate when detecting that the first pot cover assembly is closed in position, and controls the first heating assembly not to operate when detecting that the first pot cover assembly is not closed in position.

In some embodiments of the present disclosure, the first heating control assembly includes: a first controller arranged at the pot body assembly and electrically connected to the first heating assembly to control an operating state of the first heating assembly; a first cooperation member arranged at the first pot cover assembly, and the first cooperation member being configured to cooperate with the first controller to realize detection of the closing state of the first pot cover assembly; a second cooperation member arranged at the second pot cover assembly, and the second cooperation member being configured to cooperate with the first controller to realize detection of the closing state of the second pot cover assembly.

In some embodiments of the present disclosure, the first controller includes a control switch, the control switch is a micro switch, and the micro switch is configured to be triggered by the first cooperation member and the second cooperation member; or the control switch is a magnetically sensitive switch, and the first cooperation member is a first magnetic member configured to trigger the magnetically sensitive switch, and the second cooperation member is a second magnetic member configured to trigger the magnetically sensitive switch.

In some embodiments of the present disclosure, the first heating assembly does not operate when the control switch is triggered, the first cooperation member triggers the control switch when the first pot cover assembly is not closed in position and does not trigger the control switch when the first pot cover assembly is closed in position, and the second cooperation member triggers the control switch when the second pot cover assembly is closed on the pot body assembly; or the first heating assembly operates when the control switch is triggered, the first cooperation member does not trigger the control switch when the first pot cover assembly is not closed in position and triggers the control switch when the first pot cover assembly is closed in position, and the second cooperation member does not trigger the control switch when the second pot cover assembly is closed on the pot body assembly.

In some embodiments of the present disclosure, the cooking appliance further includes a second heating control assembly configured to control the second heating assembly to operate when the second pot cover assembly is closed in position.

In some embodiments of the present disclosure, the second heating control assembly includes: a second controller arranged at the second pot cover assembly and electrically connected to the second heating assembly to control an operating state of the second heating assembly; a pot body cooperation member arranged at the pot body assembly and configured to cooperate with the second controller to realize detection of the closing state of the second pot cover assembly.

In some embodiments of the present disclosure, the second controller includes a micro switch, the micro switch is triggered by the pot body cooperation member when the second pot cover assembly is closed in position and is not triggered when the second pot cover assembly is not closed in position, and the second heating assembly heats when the micro switch is triggered and does not heat when the micro switch is not triggered.

In some embodiments of the present disclosure, the pot body assembly includes a housing, the food container is arranged in the housing, the micro switch is built in the second pot cover assembly, the second pot cover assembly is provided with a mounting hole, and a push pin configured to move up and down is provided and penetrates the mounting hole. The push pin is configured to push the micro switch to act under an abutment of a pot edge of the food container.

In some embodiments of the present disclosure, an inner surface of the second pot cover assembly facing towards the pot body assembly is provided with a groove corresponding to the pot edge in terms of positions in an up-down direction, the mounting hole is formed in an upper groove wall surface of the groove, and a lower portion of the push pin extends into the groove.

In some embodiments of the present disclosure, the pot body assembly further includes a housing, and the housing has an upper surface facing towards the second pot cover assembly. The micro switch is built in the second pot cover assembly, the second pot cover assembly is provided with a mounting hole, and a push pin configured to move up and down is provided and penetrates the mounting hole. The push pin is configured to push the micro switch to act under an abutment of the upper surface of the housing.

According to some embodiments of the present disclosure, the second pot cover assembly and the pot body assembly are independently supplied with power, and the second pot cover assembly is provided with a power supply battery therein, or the second pot cover assembly is provided with a power line configured to be connected to an external power source.

In some embodiments of the present disclosure, the first cooking mode is a pressure cooking mode, and the second cooking mode is a baking cooking mode.

In some embodiments of the present disclosure, when the first pot cover assembly is closed on the pot body assembly, the first pot cover assembly is configured to rotate around a rotation axis extending along an axial direction of the pot body assembly to be closed in position, and the second pot cover assembly is configured to be translated downwards relative to the pot body assembly to be closed in position on the pot body assembly.

Additional aspects and advantages of the present disclosure will be given partly in the following descriptions, a part of which will become apparent from the following descriptions or be learned from the practice of the present disclosure.

BRIEF DESCRIPTION OF THE DRAWINGS

The above and/or additional aspects and advantages of the present disclosure will become apparent and easy to understand from descriptions of embodiments in connection with following drawings, in which:

FIG. 4 is a schematic view showing a closing state of a cooking appliance according to an embodiment of the present disclosure, in which FIG. 4a is a schematic view showing a closing state of a cooking appliance according to an embodiment of the present disclosure, in which a first pot cover assembly is in an open position, FIG. 4b is a schematic view showing a closing state of a cooking appliance according to an embodiment of the present disclosure, in which a first pot cover assembly is in a closing process, FIG. 4c is a schematic view showing a closing state of a cooking appliance according to an embodiment of the present disclosure, in which a first pot cover assembly is closed in position, FIG. 4d is a schematic view showing a closing state of a cooking appliance according to an embodiment of the present disclosure, in which a second pot cover assembly is closed in position;

FIGS. 5a, 5b, 5c and 5d in FIG. 5 are enlarged views of portions A, B, C and D circled in FIG. 4, respectively;

FIG. 7 is a schematic view of a closing state of a cooking appliance according to another embodiment of the present disclosure, in which FIG. 7a is a schematic view of a closing state of a cooking appliance according to another embodiment of the present disclosure, in which a first pot cover assembly is in an open position, FIG. 7b is a schematic view of a closing state of a cooking appliance according to another embodiment of the present disclosure, in which a first pot cover assembly is in a closing process, FIG. 7c is a schematic view of a closing state of a cooking appliance according to another embodiment of the present disclosure, in which a first pot cover assembly is closed in position, FIG. 7d is a schematic view of a closing state of a cooking appliance according to another embodiment of the present disclosure, in which a second pot cover assembly is closed in position;

FIGS. 8a, 8b, 8c and 8d in FIG. 8 are enlarged views of portions E, F, G and H circled in FIG. 7, respectively;

Figure 1:
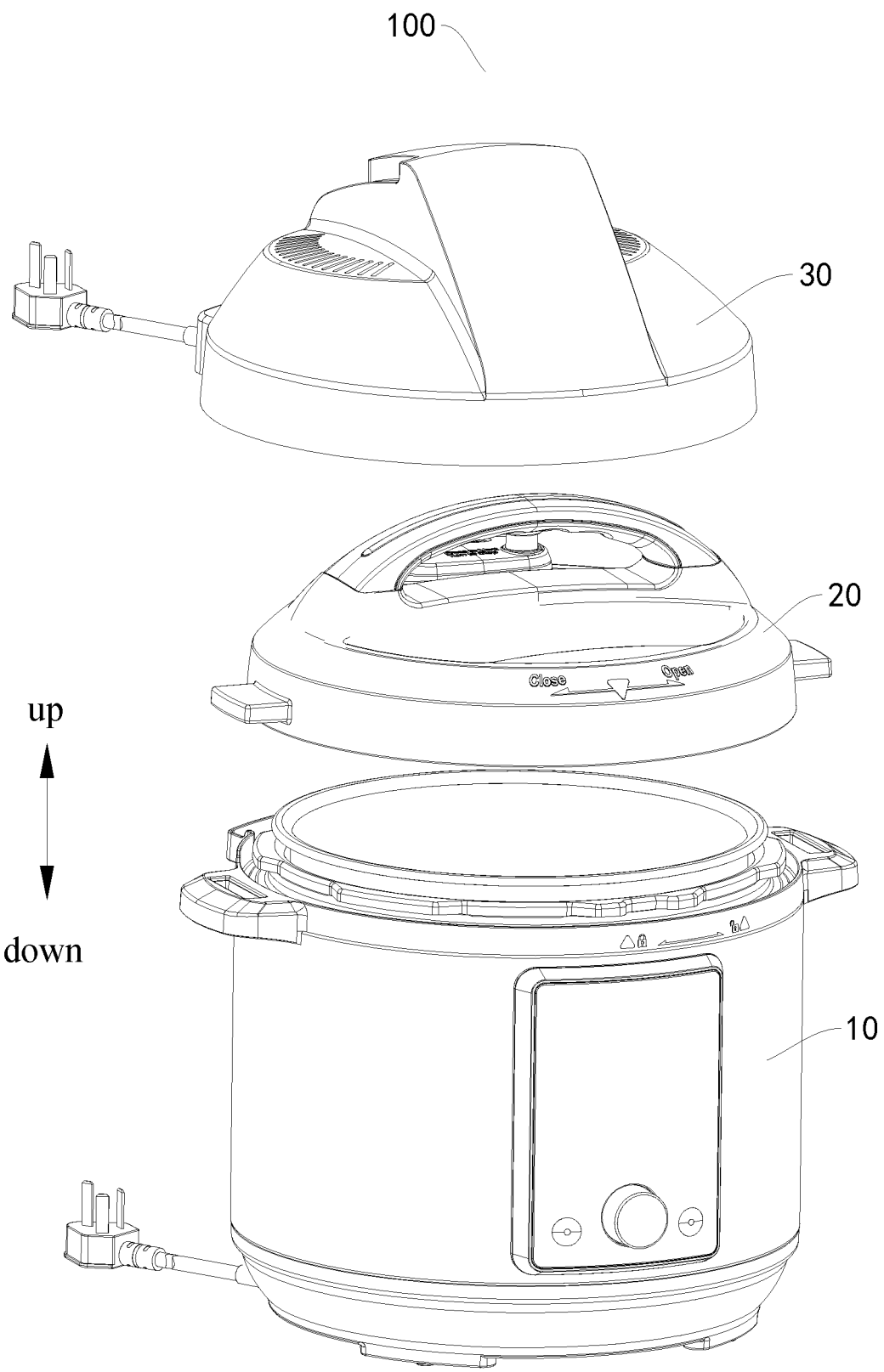
FIG. 1 is a schematic structural diagram of a cooking appliance according to an embodiment of the present disclosure.

REFERENCE NUMERALS cooking appliance 100;
pot body assembly 10; housing 11; upper surface 111; food container 12; pot edge 121; limit cooperation member 13;
first pot cover assembly 20; first limit member 21;
second pot cover assembly 30; mounting hole 301; groove 302; second heating assembly 31; push pin 32; limit protrusion 321; power line 33; second control assembly 34; fan assembly 35; temperature sensor 36; second limit member 37;
first heating control assembly 40; first controller 41; control switch 411; first cooperation member 42; second cooperation member 43; second heating control assembly 50; second controller 51; pot body cooperation member 52.

DETAILED DESCRIPTION

Embodiments of the present disclosure are further described with reference to the accompanying drawings. Same or similar reference signs represent the same or similar components or components that have the same or similar functions from beginning to end. The embodiments described below with reference to the accompanying drawings are exemplary, are merely used to explain the present disclosure, and cannot be construed as a limitation to the present disclosure.

In the specification of the present disclosure, it is to be understood that, terms such as "central," "length," "width," "thickness," "upper," "lower," "top," "bottom," "inner," "outer," "axial," "radial," "circumferential" indicate the orientation or position relationship based on the orientation or position relationship illustrated in the drawings only for convenience of description or for simplifying description of the present disclosure, and do not alone indicate or imply that the device or element referred to must have a particular orientation or be constructed and operated in a specific orientation, and hence cannot be construed as a limitation to the present disclosure.

A cooking appliance 100 according to an embodiment of the present disclosure is described below with reference to FIGS. 1-10.

Referring to FIGS. 1-8, the cooking appliance 100 according to the embodiments of the present disclosure may have a first cooking mode and a second cooking mode, and the cooking appliance 100 may include: a pot body assembly 10, a first pot cover assembly 20, a second pot cover assembly 30 and a first heating control assembly 40.

Figure 2:
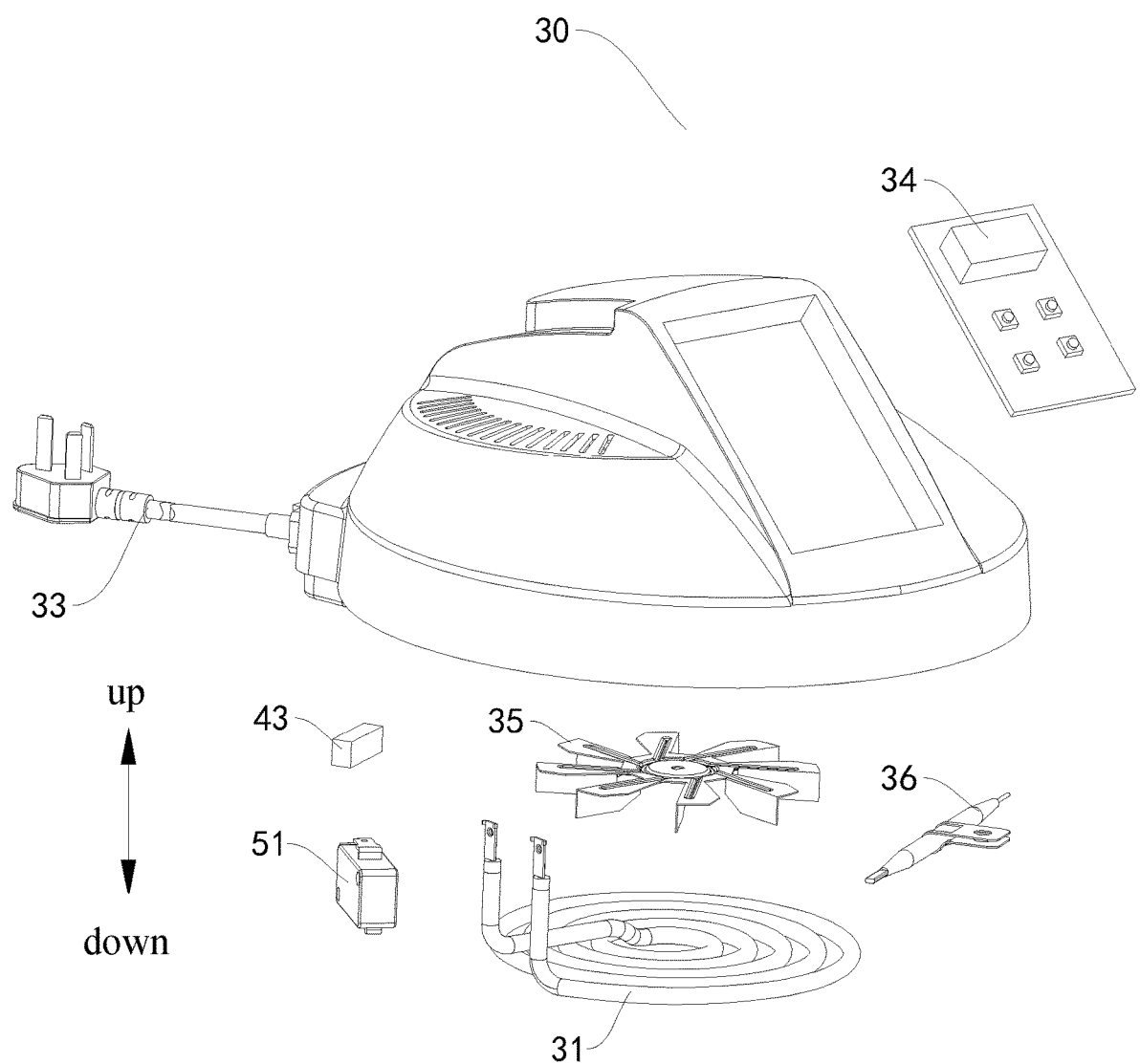
FIG. 2 is an exploded view of a second pot cover assembly 30 of a cooking appliance according to an embodiment of the present disclosure.

Specifically, the pot body assembly 10 may include a food container 12 and a first heating assembly 14. The food container 12 may be used for holding food, and the first heating assembly 14 may be used to heat the food in the food container 12. As shown in FIG. 2, the second pot cover assembly 30 may be provided with a second heating assembly 31 and the second heating assembly 31 may also be used to heat the food in the food container 12.

As shown in FIG. 4a-FIG. 4c and FIG. 7a-FIG. 7c, the first pot cover assembly 20 is closed on the pot body assembly 10, and when the first heating assembly operates, the cooking appliance 100 is in the first cooking mode. At this time, the food may be processed only by the first heating assembly, such as being steamed, braised, boiled, fried or air fried, and so on.

As shown in FIG. 4d and FIG. 7d, the second pot cover assembly 30 is closed on the pot body assembly 10, and when the second heating assembly 31 operates, the cooking appliance 100 is in the second cooking mode. At this time, the food may be processed by the second heating assembly 31, such as being steamed, braised, boiled, fried or air fried, and so on.

By replacing the first pot cover assembly 20 or the second pot cover assembly 30 which are closed on the pot body assembly 10, it is convenient for the cooking appliance 100 to operate in different cooking modes, and thus the cooking appliance 100 can meet more cooking requirements and achieve different cooking effects.

In the related art, the cooking appliance has two heating assemblies, namely an upper heating assembly and a lower heating assembly. During use, a situation exists, in which the two heating assemblies heat the food in a cooking chamber of the cooking appliance at the same time. For example, a misoperation of a user causes the two heating assemblies to operate together, which causes the food to be overheated, so that taste is affected and even safety accidents occur.

In the present disclosure, however, as shown in FIGS. 3-8, the first heating control assembly 40 is configured to detect a closing state of the second pot cover assembly 30 on the pot body assembly 10. When the first heating control assembly 40 detects that the second pot cover assembly 30 is closed on the pot body assembly 10, the first heating control assembly 40 may control the first heating assembly not to operate.

Therefore, when the second pot cover assembly 30 is closed on the pot body assembly 10, it can be ensured that the food is heated only by the second heating assembly 31, so as to prevent the first heating assembly and the second heating assembly 31 from heating the food simultaneously, which is conducive to improving the cooking taste of the food and effectively reduces the safety risk.

For example, when the cooking appliance 100 is in the first cooking mode, and if the user accidentally closes the second pot cover assembly 30 on the pot body assembly 10, the first heating control assembly 40 may control the first heating assembly not to operate, so as to prevent the safety accidents from occurring. Optionally, in some embodiments, when the first heating control assembly 40 detects the second pot cover assembly 30 in the first cooking mode, the first heating control assembly 40 may also remind the user to replace.

It should be noted that, "the second pot cover assembly 30 is closed on the pot body assembly 10" here includes a case that the second pot cover assembly 30 is closed in position and a case that the second pot cover assembly 30 is not closed in position. That is, when the second pot cover assembly 30 is closed in position or not closed in position, the first heating assembly all do not operate, so that the effect of safety protection is better.

The cooking appliance 100 according to the embodiments of the present disclosure can achieve different cooking effects, and meet different cooking requirements. Moreover, the closing state of the second pot cover assembly 30 is detected through the first heating control assembly 40, so that the first heating assembly and the second heating assembly 31 of the cooking appliance 100 do not operate simultaneously, thus effectively reducing the safety risk and improving the cooking effect of the food.

According to further embodiments of the present disclosure, as shown in FIGS. 3-8, the first heating control assembly 40 is also configured to detect a closing state of the first pot cover assembly 20 on the pot body assembly 10. When the first heating control assembly 40 detects that the first pot cover assembly 20 is closed in position, the first heating control assembly 40 may control the first heating assembly to operate. When the first heating control assembly 40 detects that the first pot cover assembly 20 is not closed in position, the first heating control assembly 40 may control the first heating assembly not to operate.

Therefore, under the control of the first heating control assembly 40, the first heating assembly can be prevented from operating when the first pot cover assembly 20 is not closed in position, which is conducive to the normal operation of the cooking appliance 100 in the first cooking mode, and to ensuring the cooking efficiency and the cooking effect of the food. Moreover, the safety accident, occurred due to the operation of the first heating assembly when the first pot cover assembly is not closed in position, is also prevented.

In addition, the first heating control assembly 40 can not only serve as a safety protection detection device of the second heating assembly 31, so as to control an operating state of the second heating assembly 31 according to the closing state of the second pot cover assembly 30, but also serve as a safety protection detection device of the first heating assembly, so as to control an operating state of the first heating assembly according to the closing state of the first pot cover assembly 20. Thus, the safety protection detection device of the first heating assembly and the safety protection detection device of the second heating assembly 31 are integrated into one, which is conducive to simplifying the structure of the cooking appliance 100 and reducing the production cost.

Figure 3:
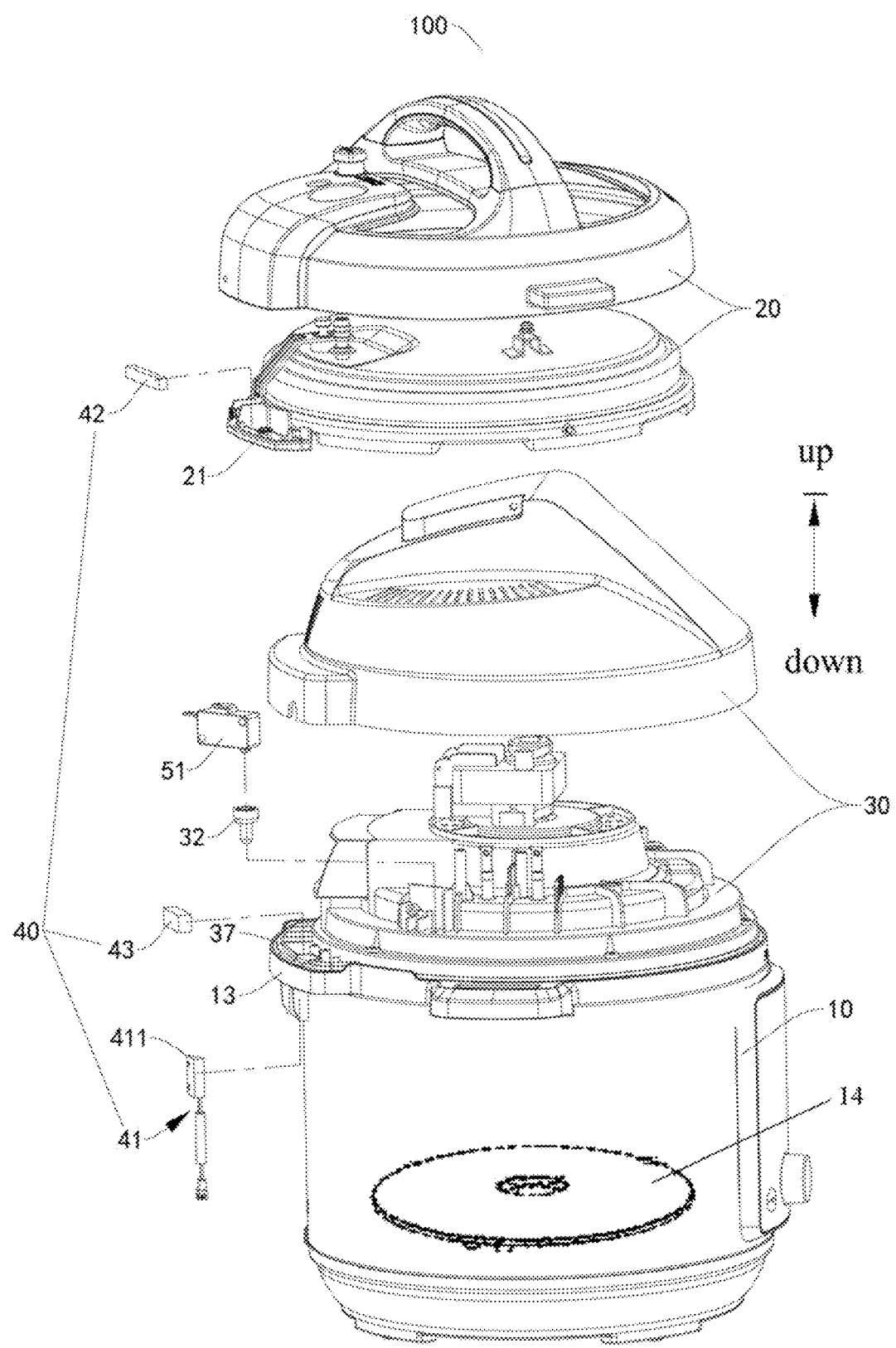
FIG. 3 is an exploded view of a cooking appliance according to an embodiment of the present disclosure.
Figure 6:
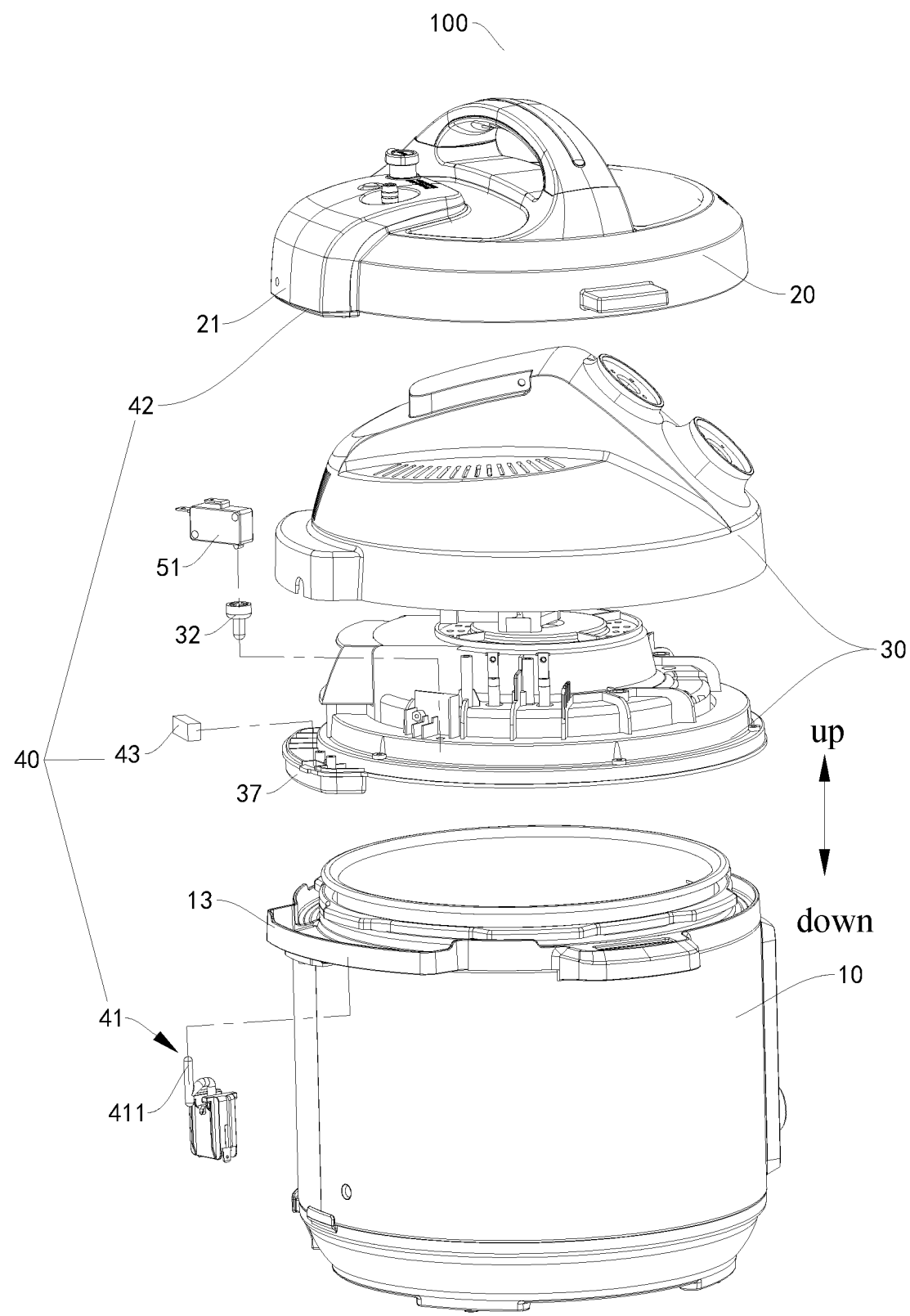
FIG. 6 is an exploded view of a cooking appliance according to another embodiment of the present disclosure.

Further, as shown in FIGS. 3 and 6, the first heating control assembly 40 may include a first controller 41, a first cooperation member 42, and a second cooperation member 43.

The first controller 41 may be arranged at the pot body assembly 10, and the first controller 41 may be electrically connected to the first heating assembly, so as to control the operating state of the first heating assembly. The first cooperation member 42 can be arranged at the first pot cover assembly 20 so as to move with a closing action of the first pot cover assembly 20, so that the first cooperation member 42 can cooperate with the first controller 41, thus realizing the detection of the closing state of the first pot cover assembly 20 through the first heating control assembly 40. The second cooperation member 43 may be arranged at the second pot cover assembly 30, so as to move with a closing action of the second pot cover assembly 30, so that the second cooperation member 43 can cooperate with the first controller 41, thus realizing the detection of the closing state of the second pot cover assembly 30 through the first heating control assembly 40. The first heating control assembly 40 has a simple structure, which is conducive to simplifying the structure of the cooking appliance 100.

Optionally, in the present disclosure, the first controller 41 may include a control switch 411. According to an actual situation, the control switch 411 may be a micro switch or a magnetically sensitive switch or the like, so that the control switch 411 has a simple structure and responses sensitively, which is conducive to improving the detection accuracy of the closing states of the first pot cover assembly 20 and the second pot cover assembly 30.

As shown in FIGS. 3-5, in an embodiment where the control switch 411 is the magnetically sensitive switch, the first cooperation member 42 is a first magnetic member, the second cooperation member 43 is a second magnetic member, and both the first magnetic member and the second magnetic member can trigger the magnetically sensitive switch, so that the magnetically sensitive switch may act according to the closing states of the first pot cover assembly 20 and the second pot cover assembly 30.

Optionally, as shown in FIGS. 4 and 5, the first magnetic member may be a strip magnet extending along a circumferential direction of the first pot cover assembly 20, and the second magnetic member may be a strip magnet extending along a circumferential direction of the second pot cover assembly 30. The magnetically sensitive switch may include a reed pipe, and the reed pipe may have a strip, circular, square or any irregular shape. When at least a part of the strip magnet is within an induction range of the reed pipe, the strip magnet may trigger the reed pipe to cause the magnetically sensitive switch to act. When the strip magnet is completely out of the induction range of the reed pipe, the strip magnet does not trigger the reed pipe, and the magnetically sensitive switch does not act.

As shown in FIGS. 6-8, in an embodiment where the control switch 411 is the micro switch, the micro switch may be triggered by the first cooperation member 42 and the second cooperation member 43, so that the micro switch acts according to the closing states of the first pot cover assembly 20 and the second pot cover assembly 30. For example, when the first cooperation member 42 or the second cooperation member 43 presses the micro switch, the micro switch is triggered to act. When the first cooperation member 42 or the second cooperation member 43 does not contact the micro switch, the micro switch is not triggered and does not act.

Here, the first cooperation member 42 may be a part of the first pot cover assembly 20 as shown in FIG. 6. For example, the first cooperation member 42 may be a lower opening edge of the first pot cover assembly 20 or a convex block protruded outwards from an outer circumferential surface of the first pot cover assembly 20, and the first cooperation member 42 may also be a separate part mounted at the first pot cover assembly 20. The second cooperation member 43 may be a part of the second pot cover assembly 30. For example, the second cooperation member 43 may be a lower opening edge of the second pot cover assembly 30 or a convex block protruded outwards from an outer circumferential surface of the second pot cover assembly 30. The second cooperation member 43 may also be a separate part mounted at the second pot cover assembly 30, as shown in FIG. 6.

In addition, in the present disclosure, the control of the operating state of the first heating assembly through the control switch 411 may include two embodiments.

In a first embodiment, as shown in FIGS. 3-8, when the control switch 411 is triggered, the first heating assembly does not operate. When the first pot cover assembly 20 is not closed in position, the first cooperation member 42 triggers the control switch 411. When the first pot cover assembly 20 is closed in position, the first cooperation member 42 does not trigger the control switch 411. When the second pot cover assembly 30 is closed on the pot body assembly 10, the second cooperation member 43 triggers the control switch 411.

Therefore, when the first pot cover assembly 20 is not closed in position, the first heating assembly does not operate, so as to prevent the food from being cooked abnormally; when the first pot cover assembly 20 is closed in position, the first heating assembly operates, and the first heating assembly may cook the food normally; when the second pot cover assembly 30 is closed on the pot body assembly 10, the first heating assembly does not operate, so that the first heating assembly and the second heating assembly 31 do not operate simultaneously, so as to prevent the safety accidents. In addition, in some specific embodiments, when neither the first pot cover assembly 20 nor the second pot cover assembly 30 is closed on the pot body assembly 10, the control switch 411 is not triggered. At this time, the first heating assembly may also operate to heat the food in the pot body assembly 10. Thus, the cooking appliance 100 may meet the user's more use requirements and provide more cooking modes.

In a second embodiment, the first heating assembly operates when the control switch 411 is triggered. When the first pot cover assembly 20 is not closed in position, the first cooperation member 42 does not trigger the control switch 411; when the first pot cover assembly 20 is closed in position, the first cooperation member 42 triggers the control switch 411; when the second pot cover assembly 30 is closed on the pot body assembly 10, the first cooperation member 42 does not trigger the control switch 411.

Therefore, followings may also be realized: when the first pot cover assembly 20 is not closed in position, the first heating assembly does not operate, so as to prevent the food from being cooked abnormally; when the first pot cover assembly 20 is closed in position, the first heating assembly operates, and the first heating assembly may cook the food normally; when the second pot cover assembly 30 is closed on the pot body assembly 10, the first heating assembly does not operate, so that the first heating assembly and the second heating assembly 31 do not operate simultaneously, so as to prevent the safety accidents.

It should be noted that "triggering the control switch 411" here refers to causing the control switch 411 to act, so as to make the control switch 411 in a trigger position, and "not triggering the control switch 411" refers to making the control switch 411 in a normal position. For example, in the embodiment where the control switch 411 is the magnetically sensitive switch including the reed pipe, triggering the magnetically sensitive switch refers to causing two reed pipes of the magnetically sensitive switch to attract and contact each other, and not triggering the magnetically sensitive switch refers to that the two reed pipes are in a normally non-contact position. In the embodiment where the control switch 411 is the micro switch, triggering the micro switch refers to connecting a moving contact to a static contact of the micro switch, and not triggering the micro switch refers to that the moving contact and the static contact are in a normally disconnected position.

Figure 9:
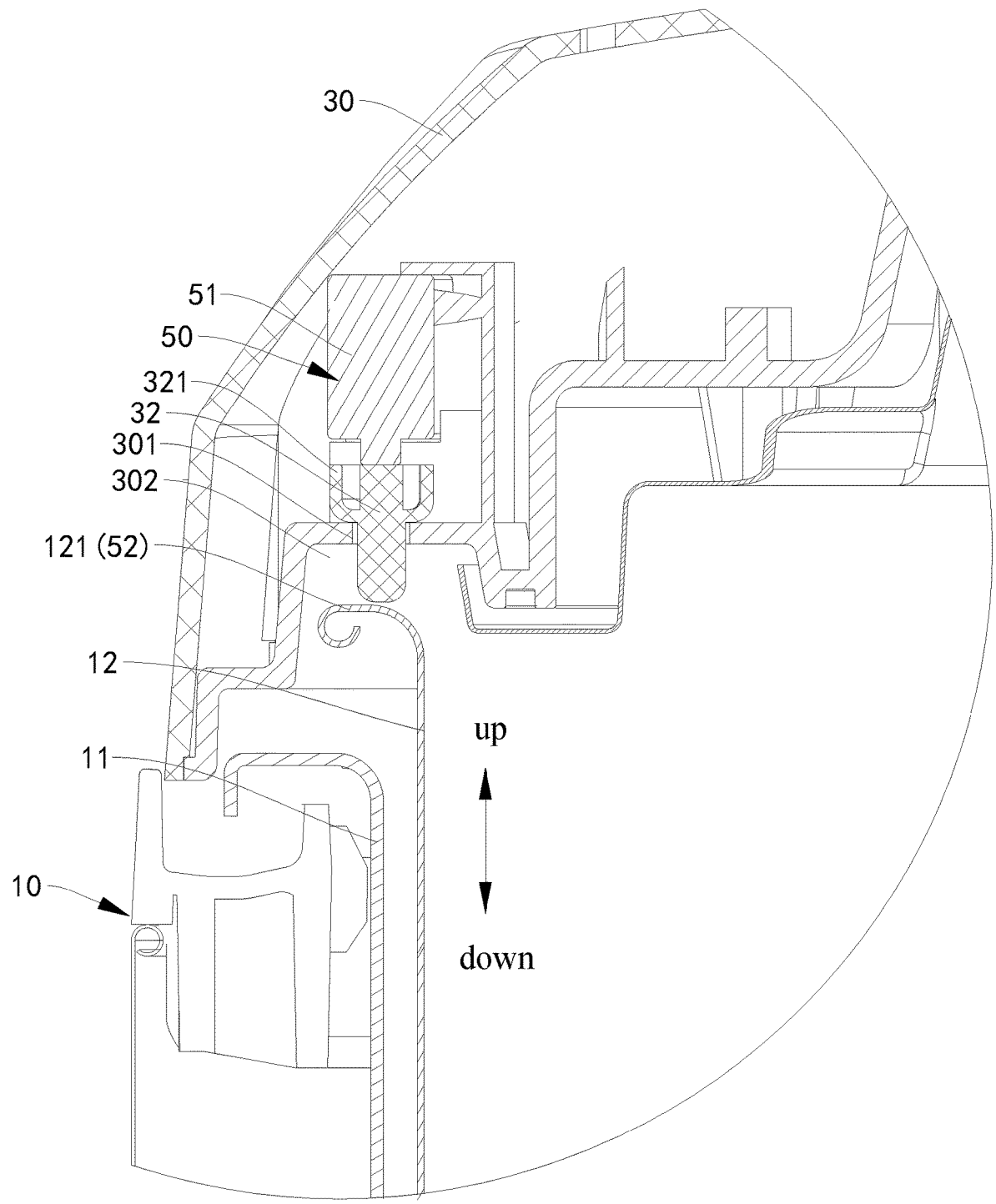
FIG. 9 is a partial sectional view of a second pot cover assembly and a pot body assembly of a cooking appliance according to an embodiment of the present disclosure.

According to some embodiments of the present disclosure, as shown in FIGS. 3, 6 and 9, the cooking appliance 100 may also include a second heating control assembly 50, and the second heating control assembly 50 is configured to control the second heating assembly 31 to operate when the second pot cover assembly 30 is closed in position. That is, the second heating control assembly 50 may detect whether the second pot cover assembly 30 is closed in position, and control the second heating assembly 31 to heat the food in the pot body assembly 10 only when the second pot cover assembly 30 is closed in position, so as to prevent the safety accident occurred due to the heating of the second heating assembly 31 when the second pot cover assembly 30 is not closed in position. Thus, the cooking appliance 100 operates more safely. In addition, the second heating control assembly 50 may also detect whether the second pot cover assembly 30 is closed on the matched pot body assembly 10, so as to prevent the danger occurred due to the heating when the second pot cover assembly 30 is closed on the mismatched pot body.

In addition, in some embodiments, as shown in FIG. 2, the second pot cover assembly 30 may also include a second control assembly 34, and the second control assembly 34 may include a user interaction module and a main control module, and the user may control the main control module through the user interaction module, so that the main control module controls start, pause, stop, heating temperature and heating time of the heating of the second heating assembly 31. Thus, the second heating assembly 31 operates under the common control of the second heating control assembly 50 and the second control assembly 34. When the second heating control assembly 50 controls the second heating assembly 31 to heat and also the second control assembly 34 controls the second heating assembly 31 to heat, the second heating assembly 31 may heat the food. However, when at least one of the second heating control assembly 50 and the second control assembly 34 controls the second heating assembly 31 not to heat, the second heating assembly 31 does not heat the food.

Optionally, as shown in FIG. 2, the second pot cover assembly 30 may also include a temperature sensor 36, the temperature sensor 36 may be electrically connected to the second control assembly 34, and the temperature sensor 36 may detect the heating temperature of the second heating assembly 31 or the temperature of air around the second heating assembly 31, so that the second control assembly 34 controls the second heating assembly 31 to heat according to results of the temperature detection.

Optionally, as shown in FIG. 2, the second pot cover assembly 30 may also include a fan assembly 35, the fan assembly 35 may be located above the second heating assembly 31, and the fan assembly 35 is configured to blow towards the food in the pot body assembly 10, so as to blow the air heated by the second heating assembly 31 to the food, thereby improving the cooking effect and the cooking efficiency of the food. Optionally, the fan assembly 35 may include a convection fan.

According to further embodiments of the present disclosure, as shown in FIG. 9, the second heating control assembly 50 may include a second controller 51 and a pot body cooperation member 52. The second controller 51 may be arranged at the second pot cover assembly 30, and the second controller 51 may be electrically connected to the second heating assembly 31, to control the operating state of the second heating assembly 31. The pot body cooperation member 52 may be arranged at the pot body assembly 10, and the pot body cooperation member 52 may cooperate with the second controller 51, so as to realize the detection of the closing state of the second pot cover assembly 30. The structure of the second heating control assembly 50 is simple, which is conducive to simplifying the structure of the cooking appliance 100.

Further, the second controller 51 may include a micro switch. When the second pot cover assembly 30 is closed in position, the micro switch may be triggered by the pot body cooperation member 52, so that the second heating assembly 31 heats the food in the pot body assembly 10; when the second pot cover assembly 30 is not closed in position, the micro switch is not triggered, and the second heating assembly 31 does not heat the food in the pot body assembly 10. Thus, the second heating assembly 31 operates only when the second pot cover assembly 30 is closed in position. The control of the micro switch is sensitive, so that the detection of the closing state of the second pot cover assembly 30 is more accurate.

In some embodiments of the present disclosure, as shown in FIG. 9, the pot body assembly 10 may also include a housing 11, and the food container 12 may be located in the housing 11. The micro switch may be built in the second pot cover assembly 30, so as to prevent the micro switch from being touched by mistake to cause the second heating assembly 31 to heat mistakenly. In addition, the second pot cover assembly 30 may be provided with a mounting hole 301, a push pin 32 may be provided and penetrates the mounting hole 301, and the push pin 32 may move up and down in the mounting hole 301.

When the second pot cover assembly 30 is not closed in position, the push pin 32 moves downwards under the action of its own gravity. An upper end of the push pin 32 is spaced from the micro switch by a predetermined distance, so that the micro switch is not triggered. When the second pot cover assembly 30 is closed in position, the push pin 32 may move upwards under the abutment of a pot edge 121 of the food container 12, to push the micro switch to act. That is, the pot edge 121 of the food container 12 may be configured as the pot body cooperation member 52, i.e., the pot body cooperation member 52 does not need to be provided additionally, and thus the structure of the pot body assembly 10 can be simplified. The micro switch is triggered by the push pin 32, and a moving stroke of the push pin 32 is larger than an action stroke of a triggering process of the micro switch, so as to avoid the damage of the micro switch caused by triggering the micro switch directly, which is also conducive to reducing the processing difficulty.

Continuing referring to FIG. 9, an outer circumferential surface of the push pin 32 may be provided with a limit protrusion 321. When the push pin 32 penetrates the mounting hole 301, the limit protrusion 321 may abut against an upper edge of the mounting hole 301, so as to prevent the push pin 32 from falling downwards out from the mounting hole 301. Of course, the limit structure of the push pin 32 includes, but is not limited to, the limit protrusion 321 shown in FIG. 9, as long as the push pin 32 can be prevented from falling out from the mounting hole 301.

In some embodiments, as shown in FIG. 9, an inner surface of the second pot cover assembly 30 facing towards the pot body assembly 10 may be provided with a groove 302, the groove 302 corresponds to the pot edge 121 in terms of positions in an up-down direction, the mounting hole 301 may be formed in an upper groove wall surface of the groove 302, and a lower portion of the push pin 32 may extend into the groove 302. When the second pot cover assembly 30 is closed on the pot body assembly 10 and is closed in position, the pot edge 121 may extend into the groove 302 to abut against the lower portion of the push pin 32. The groove 302 may limit the pot edge 121, to allow the alignment of the pot edge 121 and the push pin 32 to be accurate. Here, when the pot edge 121 extends into the groove 302, the pot edge 121 may abut against the upper groove wall surface of the groove 302, or adjacent to the upper groove wall surface of the groove 302 and spaced from the upper groove wall surface of the groove 302 by a predetermined distance.

Figure 10:
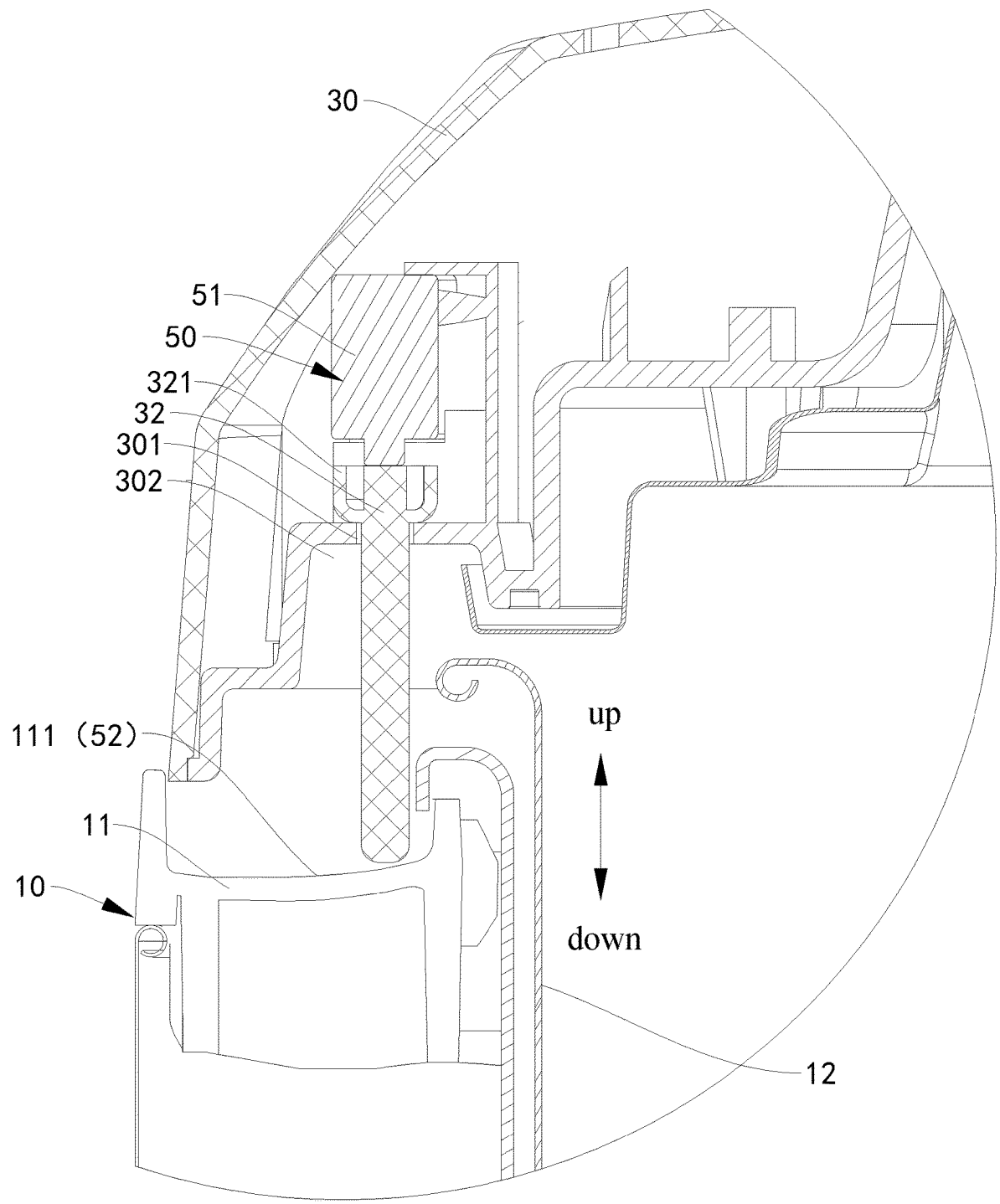
FIG. 10 is a partial sectional view of a second pot cover assembly and a pot body assembly of a cooking appliance according to another embodiment of the present disclosure.

In another embodiment, as shown in FIG. 10, the pot body assembly 10 may also include a housing 11, and the housing 11 may have an upper surface 111 facing towards the second pot cover assembly 30. The micro switch may be built in the second pot cover assembly 30, so as to prevent the micro switch from being touched by mistake to cause the second heating assembly 31 to heat mistakenly. In addition, the second pot cover assembly 30 may be provided with a mounting hole 301, a push pin 32 may be provided and penetrates the mounting hole 301, and the push pin 32 may move up and down in the mounting hole 301.

When the second pot cover assembly 30 is not closed in position, the push pin 32 moves downwards under the action of its own gravity. An upper end of the push pin 32 is spaced from the micro switch by a predetermined distance, so that the micro switch is not triggered. When the second pot cover assembly 30 is closed in position, the push pin 32 may move upwards under the abutment of the upper surface 111 of the housing 11, so as to push the micro switch to act. That is, the upper surface 111 of the housing 11 may be configured as the pot body cooperation member 52, i.e., the pot body cooperation member 52 does not need to be provided additionally, and thus the structure of the pot body assembly 10 may be simplified.

In addition, in the embodiment where the cooking appliance 100 includes the second heating control assembly 50, the second pot cover assembly 30 and the pot body assembly 10 may be independently supplied with power. Thus, the second pot cover assembly 30 and the pot body assembly 10 are in a split form, and can be completely separated, so that the second pot cover assembly 30 may not only be closed on the pot body assembly 10 to heat the food in the pot body assembly 10, but also be closed on other pot bodies and used in other cooking environments, so as to meet the user's further requirements. The practicability of the cooking appliance 100 is better.

Optionally, in the embodiment where the second pot cover assembly 30 and the pot body assembly 10 are supplied with power independently, as shown in FIG. 1 and FIG. 2, the second pot cover assembly 30 may be provided with a power supply battery therein, or the second pot cover assembly 30 may be provided with a power line 33, and the power line 33 may be connected to an external power source, so as to realize an independent power supply, which is all within the protection scope of the present disclosure.

In some embodiments of the present disclosure, the first cooking mode may be a pressure cooking mode. In the pressure cooking mode, the first heating assembly may heat the food in the pot body assembly 10, and through the cooperation of the first pot cover assembly 20 with the pot body assembly 10, an air pressure in a cooking cavity of the pot body assembly 10 may be changed to generate a positive pressure (i.e., the pressure in the cooking chamber is greater than an ambient pressure) or a negative pressure (i.e., the pressure in the cooking chamber is less than the ambient pressure). In the pressure cooking mode, the food may be processed, such as being braised, boiled, stewed, etc. The food may be cooked with high cooking efficiency, and the nutritional extraction effect is better. Optionally, the first heating assembly may heat from at least one of a bottom of the food and a side of the food.

However, in the pressure cooking mode, when the first pot cover assembly 20 is not closed in position, the first heating assembly does not heat, and the first pot cover assembly 20 does not have an independent heating source. At this time, the whole cooking appliance 100 does not heat, to avoid that a pressure is set up to cause insecurity when the pot cover assembly 20 is not closed in position.

The second cooking mode may be a baking cooking mode. In the baking cooking mode, the second heating assembly 31 may heat the food in the pot body assembly 10 from an upper side, to realize the baking, frying, air frying and other processing of the food. The food is heated evenly and the baking effect is good. The cooking appliance 100 is configured as a baking electric pressure cooker, which has two cooking modes of pressure cooking and baking cooking, thus providing great practicability.

Of course, in other embodiments of the present disclosure, the first cooking mode may be the baking cooking mode, and the second cooking mode may be the pressure cooking mode. That is, in the pressure cooking mode, the second heating assembly 31 heats the food in the pot body assembly 10, and in the baking cooking mode, the first heating assembly heats the food in the pot body assembly 10.

Optionally, in still other embodiments of the present disclosure, the first cooking mode and the second cooking mode may each also be an air-frying cooking mode, a porridge cooking mode, a soup cooking mode, etc., and the cooking appliance 100 may serve as an air fryer, an electric rice cooker, a soup cooker, etc.

Further, in the embodiment where the first cooking mode is the pressure cooking mode and the second cooking mode is the baking cooking mode, when the first pot cover assembly 20 is closed on the pot body assembly 10, as shown in FIG. 4a-FIG. 4c and FIG. 7a-FIG. 7c, the first pot cover assembly 20 may rotate around a rotation axis extending along a axial direction of the pot body assembly 10 (for example, the up-down direction shown in FIGS. 1-3) to be closed in position, so that after the first pot cover assembly 20 is closed in position, it may be fastened with the pot body assembly 10, for example, through a pot tooth and a cover tooth, so that the connection is firm and the sealing is good, which is conducive to realizing the change of the air pressure in the cooking cavity. The second pot cover assembly 30 may be translated downwards relative to the pot body assembly 10 to be closed in position on the pot body assembly 10. The air pressure in the cooking cavity does not need to be adjusted. The closing manner of the second pot cover assembly 30 and the pot body assembly 10 is simple and the operation is more convenient.

Optionally, the first pot cover assembly 20 and the second pot cover assembly 30 may be detachable from the pot body assembly 10. When the cooking appliance 100 realizes the change of cooking mode by replacing the pot cover closed on the pot body assembly 10, even if the pot cover closed on the pot body assembly 10 is the first pot cover assembly 20 or the second pot cover assembly 30, the unused pot cover may be separated from the pot body assembly 10, so that the overall height of the cooking appliance 100 is smaller and the occupied space is reduced. The operation space required is small in the process of detaching the first pot cover assembly 20 and the second pot cover assembly 30 from the pot body assembly 10, and thus the cooking appliance 100 may meet further requirements of kitchen placement and storage. For example, the cooking appliance 100 may be placed in a kitchen cabinet for use, thereby improving the practicability of the cooking appliance 100 greatly.

Optionally, as shown in FIG. 3 and FIG. 6, the pot body assembly 10 may have a limit cooperation member 13, which protrudes outwards from an outer circumferential surface of the pot body assembly 10, the second pot cover assembly 30 may have a second limit member 37, and the second limit member 37 protrudes outwards from the outer circumferential surface of the second pot cover assembly 30. When the second pot cover assembly 30 is translated downwards relative to the pot body assembly 10, as shown in FIG. 5d and FIG. 8d, the second limit member 37 corresponds to the limit cooperation member 13 in terms of positions in the up-down direction, and the second limit member 37 may cooperate with the limit cooperation member 13.

Therefore, in a circumferential direction of the pot body assembly 10, the second pot cover assembly 30 may be only translated downwards at a predetermined angle that allows the second limit member 37 to cooperate with the limit cooperation member 13, to realize that the second pot cover assembly 30 is closed in position. Optionally, the first controller 41 may be arranged at the limit cooperation member 13. As shown in FIG. 5d, the second cooperation member 43 may be arranged at the second limit member 37. Or, the second cooperation member 43 may be molded to the second limit member 37 as shown in FIG. 8d. For example, in a specific embodiment shown in FIG. 8d, a lower surface of the second limit member 37 is configured as the second cooperation member 43.

In addition, as shown in FIG. 3 and FIG. 6, the first pot cover assembly 20 may have a first limit member 21, the first limit member 21 protrudes outwards from the outer circumferential surface of the first pot cover assembly 20, and a length of the first limit member 21 extending along the circumferential direction of the first pot cover assembly 20 is less than a length of the limit cooperation member 13 extending along the circumferential direction of the pot body assembly 10. During the closing process in which the first pot cover assembly 20 rotates with respect to the pot body assembly 10, as shown in FIGS. 5a-5c and FIGS. 8a-8c, when the first pot cover assembly 20 is in an open position, a circumferential end of the first limit member 21 is aligned with a circumferential end of the limit cooperation member 13; when the first pot cover assembly 20 is closed in position, another circumferential end of the first limit member 21 is aligned with another circumferential end of the limit cooperation member 13.

As shown in FIGS. 5a-5c, the first cooperation member 42 may be arranged at the first limit member 21, or as shown in FIGS. 8a-8c, the first cooperation member 42 may be molded to the first limit member 21. For example, in the specific embodiment shown in FIGS. 8a-8c, a lower surface of the first limit member 21 is configured as the first cooperation member 42.

Optionally, as shown in FIG. 5c and FIG. 8c, when the first pot cover assembly 20 is closed in position, the control switch 411 of the first controller 41 may be spaced from the first cooperation member 42 by a predetermined distance, to avoid a case that the first cooperation member 42 triggers the control switch 411 by mistake. For example, in the embodiment where the control switch 411 is the magnetically sensitive switch and includes the reed pipe, there is still a possibility that the induction magnetic field changes and thus the control switch is triggered, when the reed pipe is close to the first cooperation member 42. When the first pot cover assembly 20 is closed in position, the reed pipe and the first cooperation member 42 are spaced from each other by a predetermined distance, which may prevent the reed pipe from being triggered by mistake.

Other configurations and operations of the cooking appliance 100 according to the embodiments of the present disclosure are known to those skilled in the related art, and are not described in detail here.

In the descriptions of the present disclosure, it should be noted that unless specified or limited otherwise, the terms "installed," "interconnected" and "connected" shall be broadly understood. For example, they may be fixed connections, or detachable connections or integrated connections; they may be mechanical connections or electric connections; they may also be direct connections or indirect connections through intermediate medium, and may also be inner communications of two elements. For those skilled in the art, the specific meaning of the above terms in the present disclosure may be understood according to specific circumstances.

Reference throughout this specification to terms "an embodiment," "a specific embodiment," "an example," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations can be made in the embodiments without departing from principles and purposes of the present disclosure. The scope of the present disclosure is defined by the claims and their equivalents.

What is claimed is:

1. A cooking appliance comprising:
    a pot body assembly including:
        a food container configured to hold food; and
        a first heating assembly configured to heat the food in the food container;
    a first pot cover assembly;
    a second pot cover assembly including a second heating assembly configured to heat the food in the food container;
    a first heating control assembly configured to:
        detect a closing state of the second pot cover assembly on the pot body assembly; and control the first heating assembly not to operate in response to detecting that the second pot cover assembly is closed on the pot body assembly;
a second heating control assembly configured to control the second heating assembly to operate in response to the second pot cover assembly being closed in position; and
a push pin;
wherein:
the second heating control assembly includes:
a controller arranged at the second pot cover assembly and electrically connected to the second heating assembly to control an operating state of the second heating assembly; and
a pot body cooperation member arranged at the pot body assembly and configured to cooperate with the controller to detect the closing state of the second pot cover assembly;
the controller includes a micro switch configured to be:
triggered by the pot body cooperation member in response to the second pot cover assembly is closed in position, and
not triggered in response to the second pot cover assembly being not closed in position;
the second heating assembly is configured to heat in response to the micro switch being triggered and not heat in response to the micro switch not being triggered;
the pot body assembly further includes a housing having an upper surface facing towards the second pot cover assembly;
the micro switch is built in the second pot cover assembly;
the second pot cover assembly is provided with a mounting hole; and
the push pin is configured to move up and down, penetrate the mounting hole, and push the micro switch to act under an abutment of the upper surface of the housing.

2. The cooking appliance according to claim 1, wherein the first heating control assembly is further configured to:
detect a closing state of the first pot cover assembly on the pot body assembly; and
control the first heating assembly to operate in response to detecting that the first pot cover assembly is closed in position, and control the first heating assembly not to operate in response to detecting that the first pot cover assembly is not closed in position.

3. The cooking appliance according to claim 2, wherein:
the controller is a first controller; and
the first heating control assembly includes:
a second controller arranged at the pot body assembly and electrically connected to the first heating assembly to control an operating state of the first heating assembly;
a first cooperation member arranged at the first pot cover assembly and configured to cooperate with the second controller to detect the closing state of the first pot cover assembly; and
a second cooperation member arranged at the second pot cover assembly and configured to cooperate with the second controller to detect the closing state of the second pot cover assembly.

4. The cooking appliance according to claim 3, wherein the second controller includes a control switch configured to be triggered by the first cooperation member and the second cooperation member.

5. The cooking appliance according to claim 4, wherein:
the micro switch is a first micro switch; and
the control switch includes a second micro switch.

6. The cooking appliance according to claim 4, wherein:
the control switch includes a magnetically sensitive switch; and
the first cooperation member includes a first magnetic member configured to trigger the magnetically sensitive switch, and the second cooperation member includes a second magnetic member configured to trigger the magnetically sensitive switch.

7. The cooking appliance according to claim 4, wherein:
the first heating assembly is configured to not operate in response to the control switch being triggered;
the first cooperation member is configured to:
trigger the control switch in response to the first pot cover assembly being not closed in position, and
not trigger the control switch in response to the first pot cover assembly being closed in position; and
the second cooperation member is configured to trigger the control switch in response to the second pot cover assembly being closed on the pot body assembly.

8. The cooking appliance according to claim 4, wherein:
the first heating assembly is configured to operate in response to the control switch being triggered;
the first cooperation member is configured to:
not trigger the control switch in response to the first pot cover assembly being not closed in position, and
trigger the control switch in response to the first pot cover assembly being closed in position; and
the second cooperation member is configured to not trigger the control switch in response to the second pot cover assembly being closed on the pot body assembly.

9. The cooking appliance according to claim 1, wherein:
the food container is arranged in the housing;
the push pin is further configured to:
move up and down, penetrate the mounting hole, and push the micro switch to act under an abutment of a pot edge of the food container.

10. The cooking appliance according to claim 9, wherein:
an inner surface of the second pot cover assembly facing towards the pot body assembly is provided with a groove corresponding to the pot edge in terms of positions in an up-down direction;
the mounting hole is formed in an upper groove wall surface of the groove; and
a lower portion of the push pin is configured to extend into the groove.

11. The cooking appliance according to claim 1, wherein:
the second pot cover assembly and the pot body assembly are configured to be independently supplied with power; and
the second pot cover assembly is provided with a power supply battery, or is provided with a power line configured to be connected to an external power source.

12. The cooking appliance according to claim 1 wherein the cooking appliance is configured to be in
a pressure cooking mode in response to the first pot cover assembly being closed on the pot body assembly and the first heating assembly operating, and
a baking cooking mode in response to the second pot cover assembly being closed on the pot body assembly and the second heating assembly operates.

13. The cooking appliance according to claim 1, wherein:
the first pot cover assembly is configured to rotate around a rotation axis extending along an axial direction of the pot body assembly to be closed in position when the first pot cover assembly is closed on the pot body assembly; and the second pot cover assembly is configured to be translated downwards relative to the pot body assembly to be closed in position on the pot body assembly when the first pot cover assembly is closed on the pot body assembly.

14. A cooking appliance comprising:
a pot body assembly including:
   a food container configured to hold food; and
   a first heating assembly configured to heat the food in the food container;
a first pot cover assembly;
a second pot cover assembly including a second heating assembly configured to heat the food in the food container; and
a heating control assembly configured to:
   detect a closing state of the second pot cover assembly on the pot body assembly;
   control the first heating assembly not to operate in response to detecting that the second pot cover assembly is closed on the pot body assembly;
   detect a closing state of the first pot cover assembly on the pot body assembly; and
   control the first heating assembly to operate in response to detecting that the first pot cover assembly is closed in position, and control the first heating assembly not to operate in response to detecting that the first pot cover assembly is not closed in position; wherein:
the heating control assembly includes:
   a controller arranged at the pot body assembly and electrically connected to the first heating assembly to control an operating state of the first heating assembly;
   a first cooperation member arranged at the first pot cover assembly and configured to cooperate with the controller to detect the closing state of the first pot cover assembly; and
   a second cooperation member arranged at the second pot cover assembly and configured to cooperate with the controller to detect the closing state of the second pot cover assembly;
the controller includes a control switch configured to be triggered by the first cooperation member and the second cooperation member;
the control switch includes a magnetically sensitive switch; and
the first cooperation member includes a first magnetic member configured to trigger the magnetically sensitive switch, and the second cooperation member includes a second magnetic member configured to trigger the magnetically sensitive switch.

15. A cooking appliance comprising:
a pot body assembly including:
   a housing;
   a food container arranged in the housing and configured to hold food; and
   a first heating assembly configured to heat the food in the food container;
a first pot cover assembly;
a second pot cover assembly including a second heating assembly configured to heat the food in the food container;
a first heating control assembly configured to:
   detect a closing state of the second pot cover assembly on the pot body assembly;
   control the first heating assembly not to operate in response to detecting that the second pot cover assembly is closed on the pot body assembly;
a second heating control assembly configured to control the second heating assembly to operate in response to the second pot cover assembly being closed in position; and
a push pin;
wherein:
the second heating control assembly includes:
   a controller arranged at the second pot cover assembly and electrically connected to the second heating assembly to control an operating state of the second heating assembly; and
   a pot body cooperation member arranged at the pot body assembly and configured to cooperate with the controller to detect the closing state of the second pot cover assembly;
the controller includes a micro switch configured to be:
   triggered by the pot body cooperation member in response to the second pot cover assembly is closed in position, and
   not triggered in response to the second pot cover assembly being not closed in position;
the second heating assembly is configured to heat in response to the micro switch being triggered and not heat in response to the micro switch not being triggered;
the micro switch is built in the second pot cover assembly;
the second pot cover assembly is provided with a mounting hole; and
the push pin is configured to move up and down, penetrate the mounting hole, and push the micro switch to act under an abutment of a pot edge of the food container.

* * * * *